United States Patent
Scheib et al.

(10) Patent No.: US 6,517,114 B1
(45) Date of Patent: Feb. 11, 2003

(54) STEERING COLUMN STRUCTURAL SUPPORT SYSTEM AND METHOD

(75) Inventors: Charles Joseph Scheib, Kettering, OH (US); Stephen Moore Pitrof, Bellbrook, OH (US); George Frank Richards, Springfield, OH (US); David C. McClellan, Xenia, OH (US); Sang Jun Park, Suwon (KR)

(73) Assignees: Delphi Technologies Inc, Troy, MI (US); Hyundai Motor Company (KR)

( * ) Notice: Subject to any disclaimer, the term of this patent is extended or adjusted under 35 U.S.C. 154(b) by 0 days.

(21) Appl. No.: 09/702,906

(22) Filed: Oct. 24, 2000

Related U.S. Application Data

(60) Provisional application No. 60/183,949, filed on Feb. 22, 2000.

(51) Int. Cl.[7] .............................. B62D 25/14; B62D 1/18
(52) U.S. Cl. ........................ 280/779; 180/90; 74/492; 296/70; 296/203.02
(58) Field of Search ...................... 296/70, 72, 203.02; 280/777, 779; 180/90; 74/492

(56) References Cited

U.S. PATENT DOCUMENTS

| | | | | |
|---|---|---|---|---|
| 3,702,081 A | * | 11/1972 | Arnston | 74/492 |
| 3,709,057 A | * | 1/1973 | Kitzner et al. | 74/492 |
| 3,785,671 A | * | 1/1974 | Salewsky | 280/777 |
| 4,228,695 A | * | 10/1980 | Trevisson et al. | 188/371 |
| 4,432,565 A | * | 2/1984 | Suzuki et al. | 180/90 |
| 5,026,092 A | * | 6/1991 | Abramczyk | 280/777 |
| 5,114,182 A | * | 5/1992 | Thull et al. | 280/779 |
| 5,181,435 A | * | 1/1993 | Khalifa et al. | 248/900 |
| 5,326,130 A | | 7/1994 | Gedeon et al. | 280/752 |
| 5,452,916 A | * | 9/1995 | Beecher et al. | 280/777 |
| 5,556,153 A | | 9/1996 | Kelman et al. | 296/70 |
| 5,564,769 A | * | 10/1996 | Deneau et al. | 180/90 |
| 5,676,216 A | | 10/1997 | Palma et al. | 180/90 |
| 5,706,704 A | * | 1/1998 | Riefe et al. | 188/371 |
| 5,709,601 A | | 1/1998 | Heck | 454/121 |
| 5,810,393 A | * | 9/1998 | Joest et al. | 280/750 |
| 5,957,498 A | * | 9/1999 | Holland et al. | 280/779 |
| 5,979,965 A | | 11/1999 | Nishijima et al. | 296/70 |
| 6,027,088 A | * | 2/2000 | Stedman et al. | 248/200 |
| 6,110,037 A | | 8/2000 | Yoshinaka | 454/143 |
| 6,170,873 B1 | * | 1/2001 | Jurik et al. | 188/371 |
| 6,203,092 B1 | | 3/2001 | Yoshinaka | 296/70 |

FOREIGN PATENT DOCUMENTS

| | | | | |
|---|---|---|---|---|
| JP | 58-447 A | * | 1/1983 | |
| JP | 59018065 A | * | 1/1984 | |
| JP | 1-240383 A | * | 9/1989 | |
| JP | 3-157265 A | * | 7/1991 | |
| JP | 5-185957 A | * | 7/1993 | |
| JP | 10-129501 A | * | 5/1998 | |
| JP | 11-1988823 | * | 9/1999 | |
| JP | 0960785 A2 | | 12/1999 | B60R/21/045 |
| JP | 2000103307 | | 4/2000 | B60R/21/045 |
| WO | WO 00/50292 | | 8/2000 | B62D/25/14 |

OTHER PUBLICATIONS

International Search Report, corresponding to International Application No. PCT/US 01/40389, dated Mar. 28, 2001 and a copy of each of the publications cited therein.

* cited by examiner

*Primary Examiner*—Paul M. Dickson
*Assistant Examiner*—Ruth Ilan
(74) *Attorney, Agent, or Firm*—Kathryn A. Marra

(57) ABSTRACT

An integrated steering column structural system for distributing a load of a steering column within a vehicle is disclosed. The structural system includes a steering column bracket for retaining the steering column and for distributing the steering column load throughout the vehicle. The structural system further includes a plurality of load distribution components for receiving the load of the steering column and ultimately distributing the load to a vehicle structural frame. The steering column bracket utilizes a plurality of pathways through which to distribute the load of the steering column to the load distribution components.

14 Claims, 10 Drawing Sheets

STEERING COLUMN STRUCTURAL SUPPORT SYSTEM AND METHOD

CROSS REFERENCE TO RELATED APPLICATIONS

This application claims the benefit of U.S. patent application Ser. No. 60/183,949, filed Feb. 22, 2000, the contents of which are incorporated by reference hereto.

TECHNICAL FIELD

The present invention relates generally to vehicle interior structures, and more particularly to an integrated steering column support system.

BACKGROUND OF THE INVENTION

Typically, a steering assembly of a vehicle includes a steering column extending between a steering mechanism, for example, a steering wheel, and a torque distribution mechanism. The steering column is designed to translate rotation of the steering wheel by a vehicle operator to the torque distribution mechanism which correspondingly positions the wheels of the vehicle in accordance with the position of the steering wheel, thus steering the vehicle.

It is desired that the steering column be of a sufficient compressive, shear, and torsional strength to endure the above described usage. The steering column designed as such can have a substantial mass and thus must be properly supported within the vehicle for effective functioning of the vehicle steering assembly.

Accordingly, the steering column is supported by attachment to a cross-car structural beam located within the vehicle. The downward load resulting from the weight of the steering column is distributed through the cross-car structural beam to side walls of the vehicle where the cross-car structural beam is mounted thereto. The weight of the steering column is thereby conveyed, through the side walls, to a steel frame of the vehicle.

The cross-car structural beam is composed of steel so that it may support the weight of the steering column. This results in substantial mass within the vehicle.

The cross-car structural beam is also used to support an instrument panel assembly and an HVAC air duct system, both located about the beam. The structural beam further serves as a reaction surface for occupant protection devices such as air bags or knee bolsters.

These uses, in combination with functioning as a support for the steering column, further increase the required mass of the cross-car structural beam and thus add additional weight and materials to the vehicle.

In addition to compensating for the weight of the steering column, the vehicle structural system must accommodate for a first natural frequency and the undesirable effects thereof. The first natural frequency is a vibratory level of the vehicle structural system which, when reached, can result in vertical oscillatory displacement of the steering column within the vehicle.

The cross-car structural beam typically is relied upon in vehicle structural systems to prevent the occurrence of such displacement. This is accomplished by designing the beam to increase the first natural frequency beyond a level anticipated to be reached during various vehicle operating modes. Additional mass and materials are added to the cross-car structural beam in order to prevent the occurrence of the first natural frequency.

The additional mass and materials required of a vehicle structural system to accommodate the weight of the steering column assembly and to prevent against steering column displacement due to the first natural frequency, adds mass and thus increases the weight of the vehicle. This reduces the vehicle's fuel efficiency, increases costs, complicates methods of manufacture, and encumbers maintenance and repair.

Accordingly, it is desirable to have a light weight steering column structural assembly that provides all of the necessary support for various vehicular applications as well as being economically efficient to manufacture and assemble.

SUMMARY OF THE INVENTION

According to the present invention, an integrated steering column structural system is provided for supporting various loads of a steering column disposed within a vehicle.

The structural system generally comprises a steering column bracket for retaining the steering column and for distributing various steering column loads throughout the vehicle. The structural system further includes a plurality of load distribution components for receiving the various loads of the steering column and ultimately distributing the load to a vehicle structural frame. The steering column bracket utilizes a plurality of pathways through which to distribute the various loads of the steering column to the load distribution components.

The integrated steering column structural system is directed toward distributing the downward load within the vehicle caused by the weight of the steering column. In addition, the structural system is designed to resist against steering column displacement caused by a first natural frequency of the vehicle structural frame, which subjects the steering column to various loadings.

The integrated steering column structural system distributes the above-mentioned loads to the various load displacement components that, in turn, distribute the loads to the structural frame of the vehicle.

Distribution of the steering column loads as described, results in each individual load displacement component bearing only a fraction of the total steering column load. Thus, the load displacement components may be of a reduced mass, requiring less material in their construction, therefore incurring less manufacturing costs and generally resulting in an overall lower weight, and a more fuel-efficient vehicle.

In one embodiment according to the present invention, the load displacement components include a structural air duct assembly disposed across the width of the vehicle proximate to a vehicle occupant compartment. The structural air duct assembly has a lower surface which mates with a first surface of the steering column bracket. The steering column bracket correspondingly has a second surface to which the steering column is mounted.

The load displacement components further include a plenum which is also mounted to the first surface of the steering column bracket. The plenum is a conventional structural element of the vehicle through which the steering column loads are distributed to the structural frame of the vehicle.

Finally, the load displacement components include an engine wall located within the vehicle between an engine and the occupant compartment. The steering column bracket has an extension portion which connects the engine wall and the steering column bracket, thereby allowing load distribution.

Thus, the integrated steering column structural system of the present invention offers three load distribution pathways by which to transfer the various steering column loads to the structural frame of the vehicle. A first load distribution pathway exists from the steering column bracket to the structural air duct assembly, the second pathway exists from the steering column bracket to the plenum, and the third pathway exists from the steering bracket to the engine wall.

In this way, a fraction of the total load exerted by the steering column is carried by each of the load displacement components. Therefore, these parts may be designed with less mass than were they to bear the entire force of the load exerted by the steering column. Polymeric materials and composite materials may be used in lieu of metals, such as steel, which are considerably more costly and less workable.

The reduction and alteration of construction materials used within the vehicle results in overall cost diminution and reduced labor allocations. Further, the steering column bracket is releasably fastened to the load displacement components within the vehicle, thus permitting ease of installation and maintenance.

The above-described and other features and advantages of the present invention will be appreciated and understood by those skilled in the art from the following detailed description, drawings, and appended claims.

BRIEF DESCRIPTION OF THE DRAWINGS

The present invention will now be described, by way of example only, with reference to the accompanying drawings in which.

DESCRIPTION OF THE PREFERRED EMBODIMENT

Figure 1:
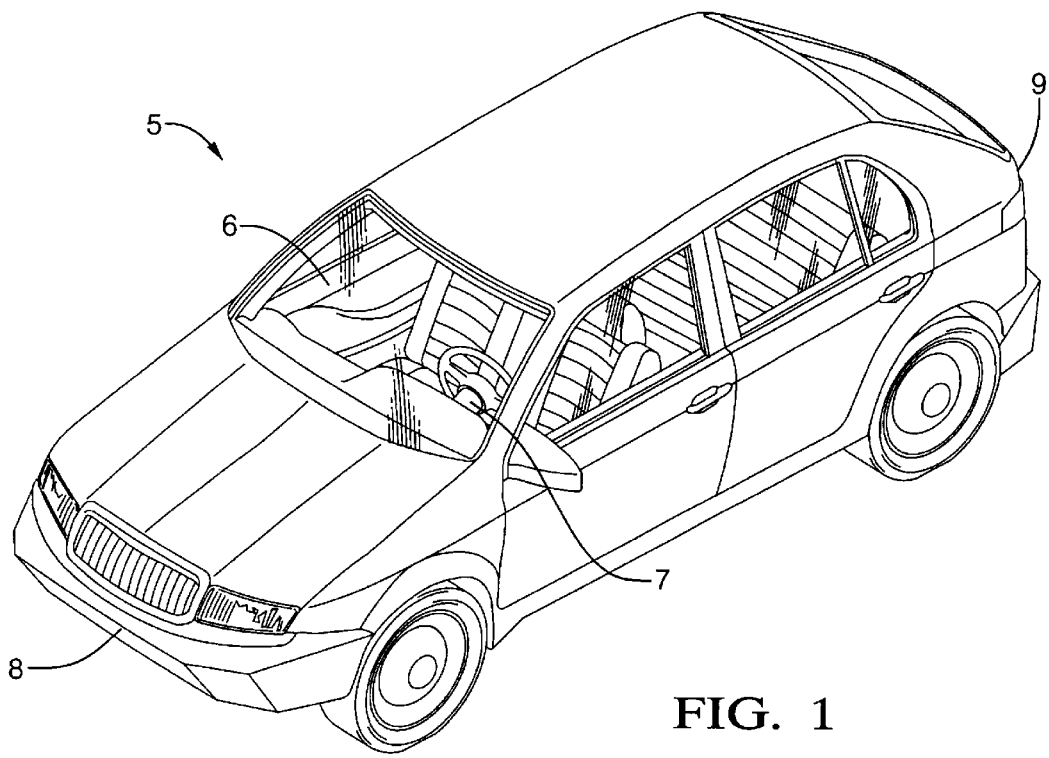
FIG. 1 is a perspective view of a vehicle.
Figure 3:
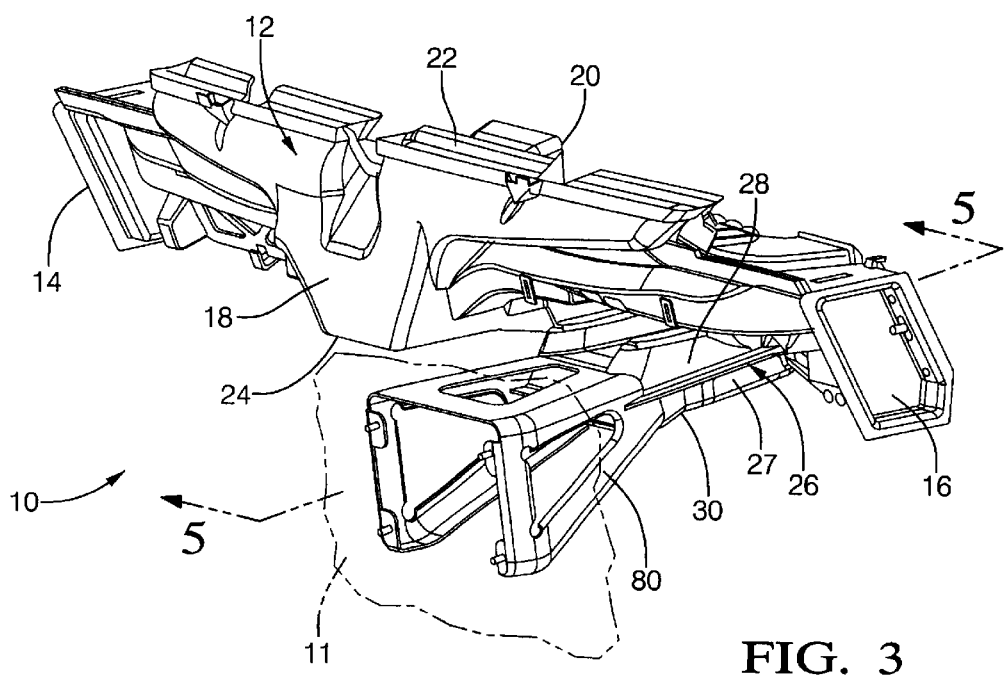
FIG. 3 is an enlarged perspective view of the integrated steering column structural system of FIG. 1.
Figure 2:
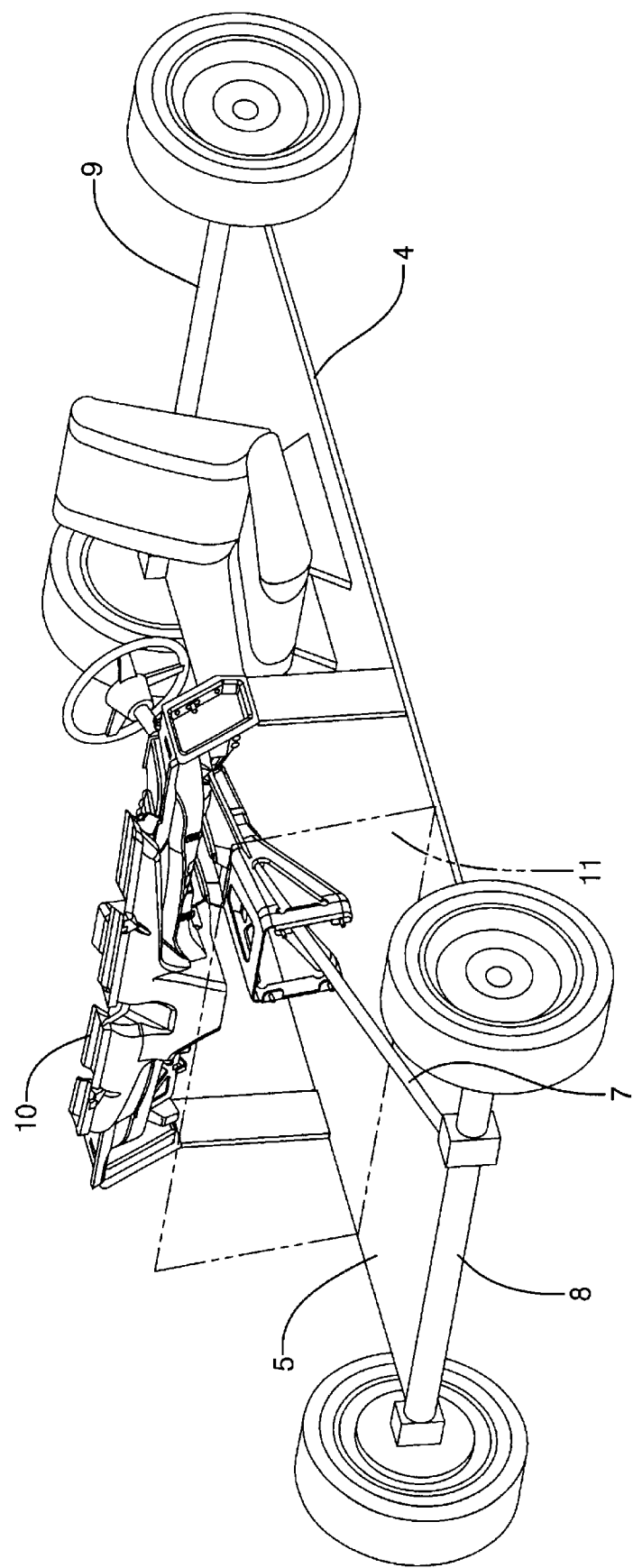
FIG. 2 is a perspective view of an integrated steering column structural system in one embodiment according to the present invention.
Figure 4:
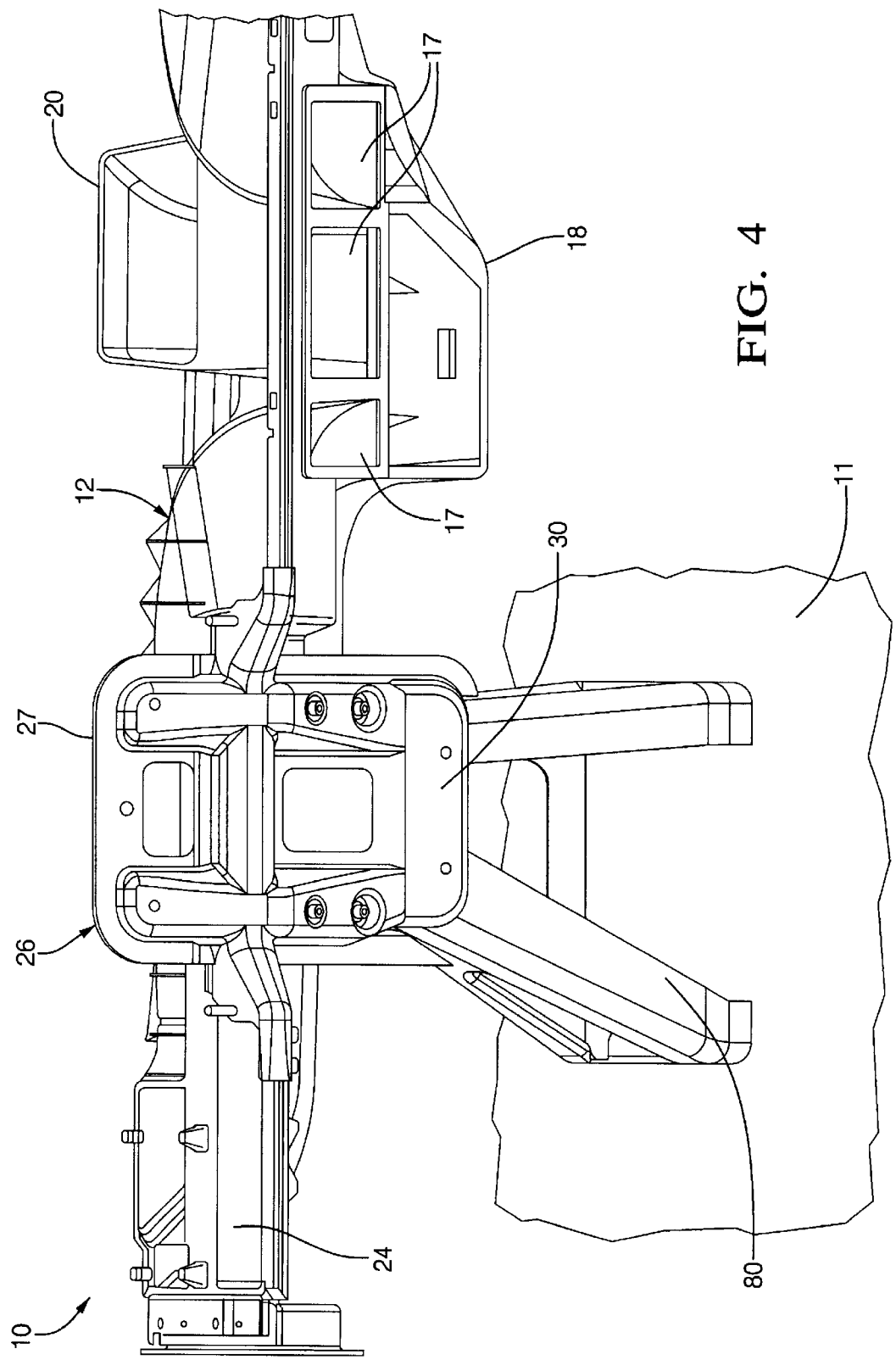
FIG. 4 is another perspective view of the integrated steering column structural system of FIG. 3.

Referring to FIGS. 1–4, an integrated steering column structural system 10, in one embodiment of the present invention, is configured for placement within a vehicle 5, preferably proximate to a vehicle occupant compartment 6. Vehicle 5 includes a structural frame 4 which, in part, bears the load of the vehicle.

Structural system 10 is located in the path of a steering column 7 between vehicle occupant compartment 6 and an engine wall 11. Engine wall 11 is disposed proximate to a first end 8 of vehicle 5 and generally separates the engine from vehicle occupant compartment 6.

Structural system 10 includes a structural air duct assembly 12 disposed across the width of the vehicle mounted to vehicle side walls at mountings 14 and 16. Structural air duct assembly 12 extends in a cross-car direction, i.e. from side to side.

Structural air duct assembly 12 includes a plurality of airflow passageways 17 for distributing air from a heating, ventilation, and air-conditioning (HVAC) module to vehicle occupant compartment 6. Structural air duct assembly 12 may also include common structural enhancements such as a composite beam or a rib structure to provide support for the steering column.

Structural air duct assembly 12 is defined by a first side 18 generally located proximate to engine wall 11. A second side 20 is located opposite first side 18 and proximate to vehicle occupant compartment 6 when the structural air duct assembly 12 is positioned within the vehicle. Structural air duct assembly 12 also includes an upper surface 22 and a lower surface 24 arranged opposite one another.

With reference now to FIGS. 1–11, integrated steering column structural system 10 further includes a steering column bracket 26. Bracket 26 is secured to structural air duct assembly 12 at lower surface 24. Steering column bracket 26 is positioned such that the bracket extends from air duct assembly 12 towards engine wall 11.

Steering column bracket 26 includes a bracket portion 27. Bracket portion 27 mounts with structural air duct assembly 12. The bracket portion is defined by a first surface 28 and a second surface 30 located opposite one another. First surface 28 is located adjacent to air duct assembly 12. First and second surfaces 28 and 30 are mounted to one another, for example by welding, to form bracket portion 27.

First and second surfaces 28 and 30 may be composed of any of a plurality of materials suitable for application of the steering column bracket as described herein and contemplated within the scope of the present invention. For example, first and second surfaces 28 and 30 may be constructed of steel.

First surface 28 includes a flange 32 formed proximate to the structural air duct assembly 12. In one embodiment, flange 32 is upturned, i.e. configured so as to extend toward structural air duct assembly 12. In this way, mating of steering column bracket 26 and assembly 12 is facilitated.

First surface 28 also includes protuberances 34 and 36 (best shown in FIG. 6), formed proximate to side edges 38 and 40, respectively, of steering column bracket 26. Protuberances 34 and 36 extend along a length of bracket portion 27, from structural air duct assembly 12 towards engine wall 11.

Protuberances 34 and 36 include plenum mounting flanges 35 and 37 located thereon, respectively. Plenum mounting flanges 35 and 37 are preferably integrally molded elements which slidably receive and releasably retain a plenum 13.

Figure 5:
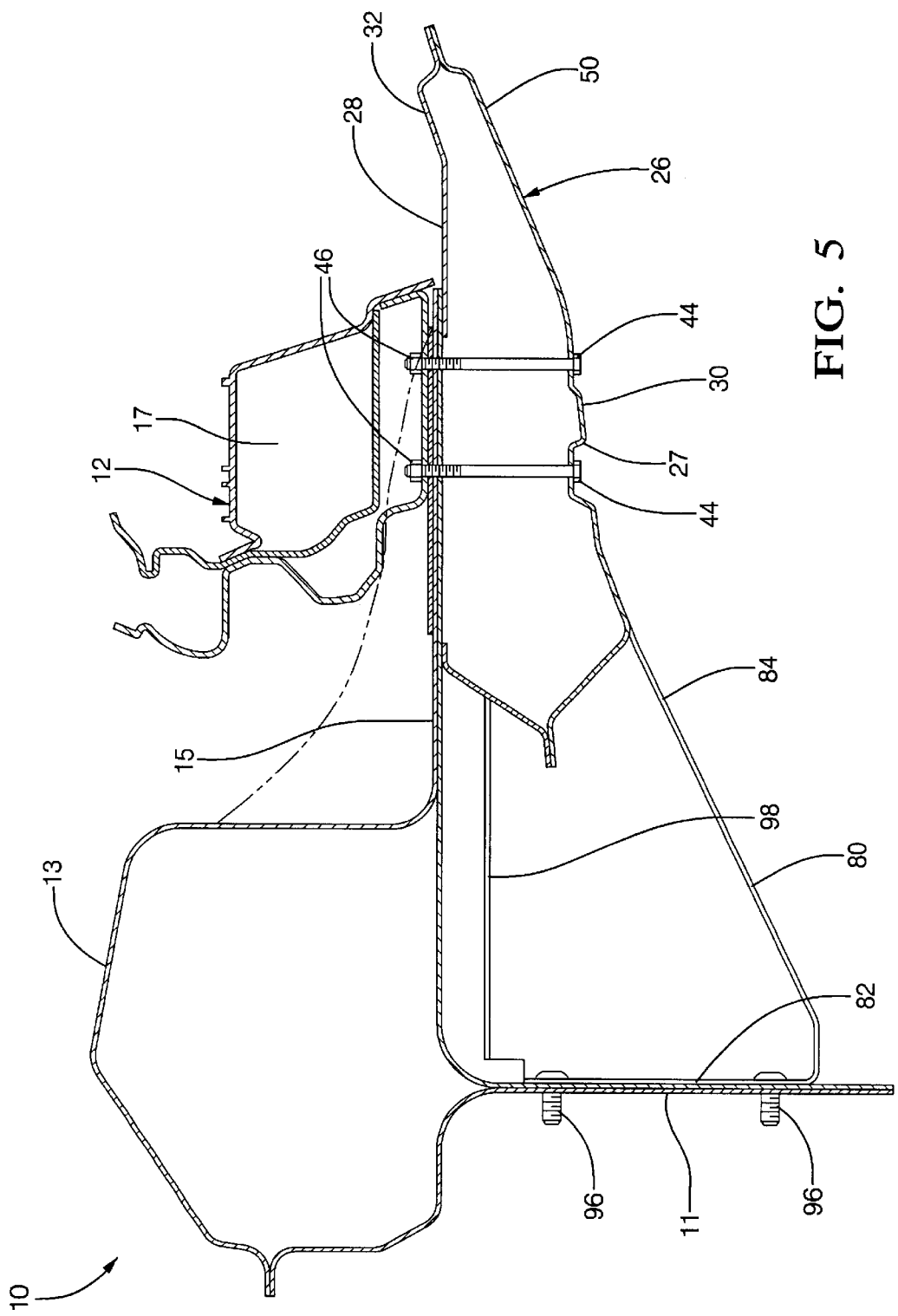
FIG. 5 is a cross-sectional view a long lines 5—5 of the integrated steering column structural system of FIG. 3, including a plenum located thereon.
Figure 6:
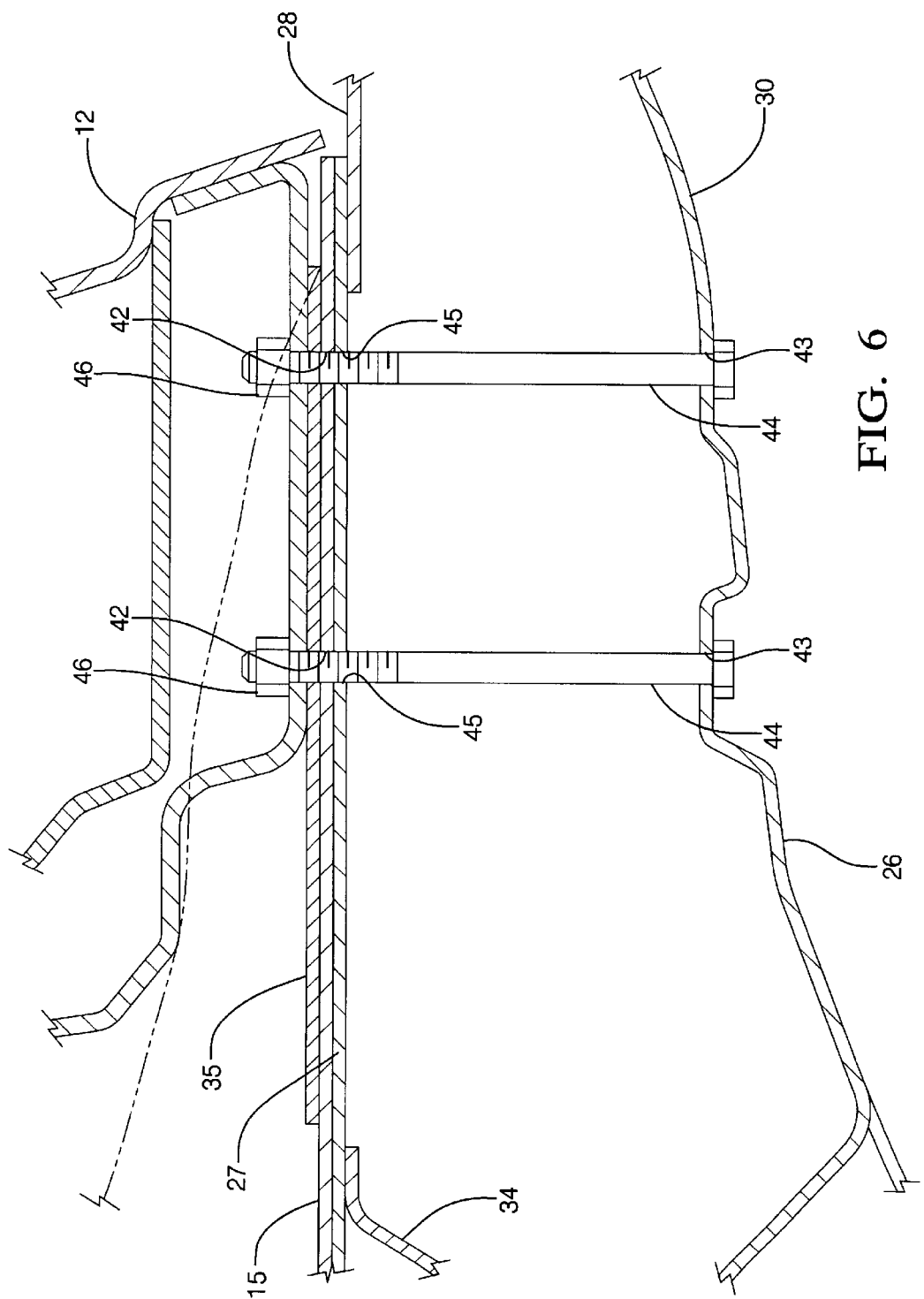
FIG. 6 is an enlarged view of a portion of the integrated steering column structural system of FIG. 5.
Figure 9:
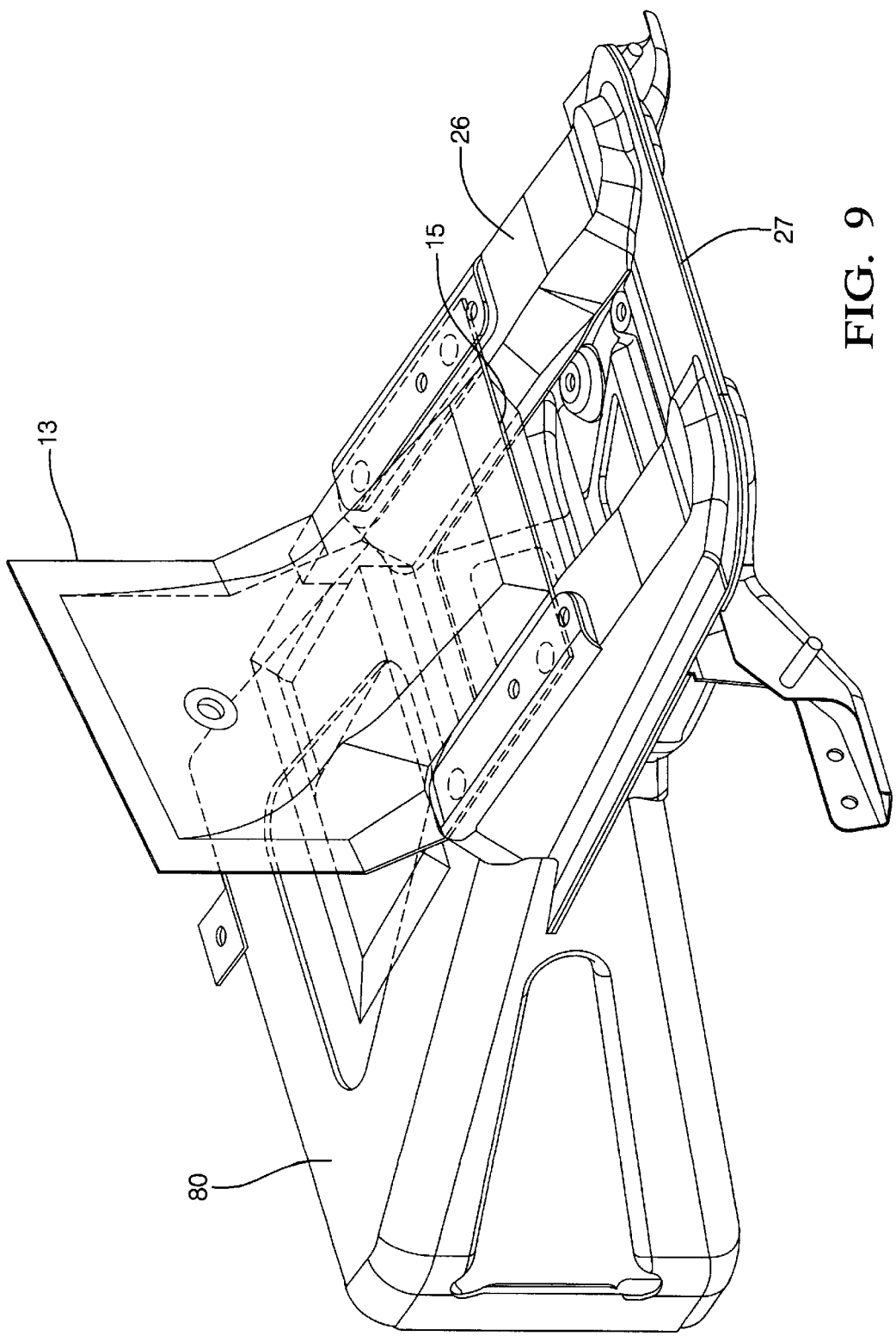
FIG. 9 is a perspective view of the steering column bracket of FIG. 7 illustrating a plenum mounted thereto.

Plenum 13 is a structural element of the vehicle disposed adjacent and mounted to engine wall 11 (FIGS. 5 and 9). Plenum 13 includes a mounting member 15 which slidably engages plenum mounting flanges 35 and 37.

Plenum mounting flanges 35 and 37 include a plurality of mounting holes 42, formed therein to facilitate mounting of steering column bracket 26, the plenum 13, and the structural air duct assembly 12. Mounting holes 42 open to an interior of steering column bracket 26 and are aligned with mounting holes 43, formed in second surface 30 of steering column bracket 26.

First surface 28 is mounted to structural air duct assembly 12 by fasteners. For example, bolts 44 extend from second surface 30 through mounting holes 43, through the interior of steering column bracket 26, and through mounting holes 42 into structural air duct assembly 12, wherein bolts 44 are secured therein with a plurality of fastening members. For example, nuts 46 are fastened to bolts 43 within assembly 12.

Mounting member 15 of plenum 13 also includes plenum mounting holes 45 which align with mounting holes 42 and 43, allowing passage of the bolts 44 therethrough.

Thus, lower surface 24 of structural air duct assembly 12 is mounted to first surface 28 of bracket portion 27 by bolts 44, with plenum mounting member 15 secured therebetween. Bolts 44 are fastened by fastening nuts 46.

It will be appreciated that steering column bracket 26 may be mounted to plenum 13, and to structural air duct assembly 12 in any other of a plurality of suitable means including, but not limited to, welding.

First surface 28 additionally includes a plurality of apertures 48 formed between protuberances 34 and 36 to provide a reduction in mass of steering column bracket 26 without reducing the structural integrity thereof.

Figure 10:
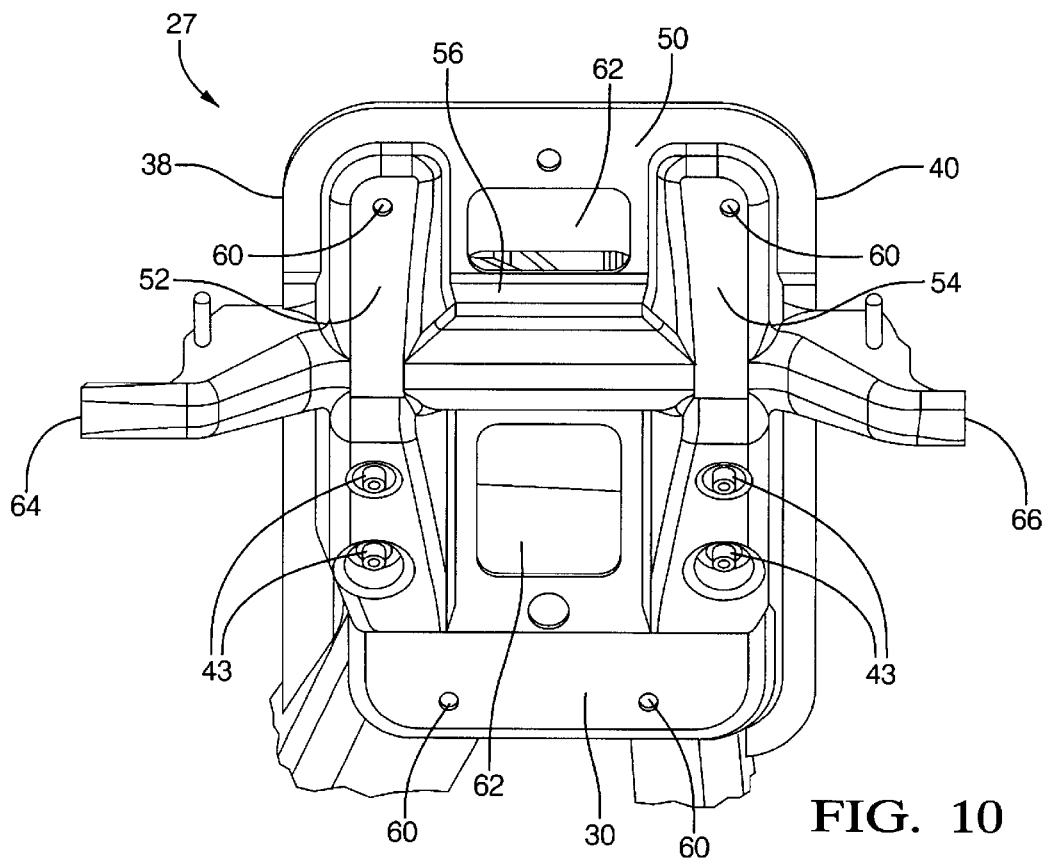
FIG. 10 is another perspective view of the steering column bracket of FIG. 7.
Figure 11:
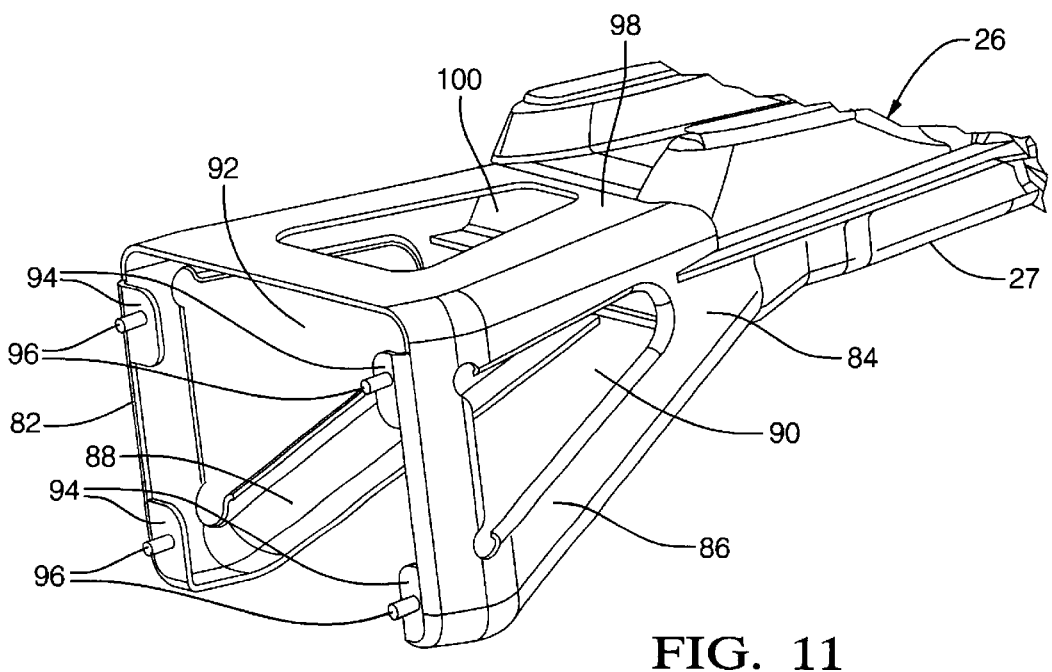
FIG. 11 is a perspective view of the another portion of the steering column bracket of FIG. 7.

Referring specifically to FIGS. 5 and 10, second surface 30 of bracket portion 27 includes a flange 50 formed adjacent to flange 32. Flange 50 is upturned to correspond with flange 32 such that the upturned flange 50 is proximate to the structural air duct assembly 12.

Second surface 30 also includes a first protuberance 52 and a second protuberance 54 formed proximate to side edges 38 and 40, respectively. First and second protuberances 52 and 54 extend along the length of bracket portion 27 from structural air duct assembly 12 toward engine wall 11.

Second surface 30 also includes a third protuberance 56 formed perpendicular to side edges 38 and 40. In one embodiment, third protuberance 56 is centrally located on second surface 30. The third protuberance extends perpendicularly from first protuberance 52 to second protuberance 54. In this way, first, second, and third protuberances 52, 54, and 56 are configured so as to form an H-shape on second surface 30.

As discussed above, second surface 30 also includes mounting holes 43 formed therein for facilitating the mounting of steering column bracket 26 to structural air duct assembly 12.

Additionally, second surface 30 includes steering column mounting holes 60 formed therein. Mounting holes 60 allow for the mounting of steering column 7 to steering column bracket 26.

Second surface 30 also includes apertures 62 for contributing to the reduction in mass of steering column bracket 26 without reducing structural integrity of second surface 30.

Figure 7:
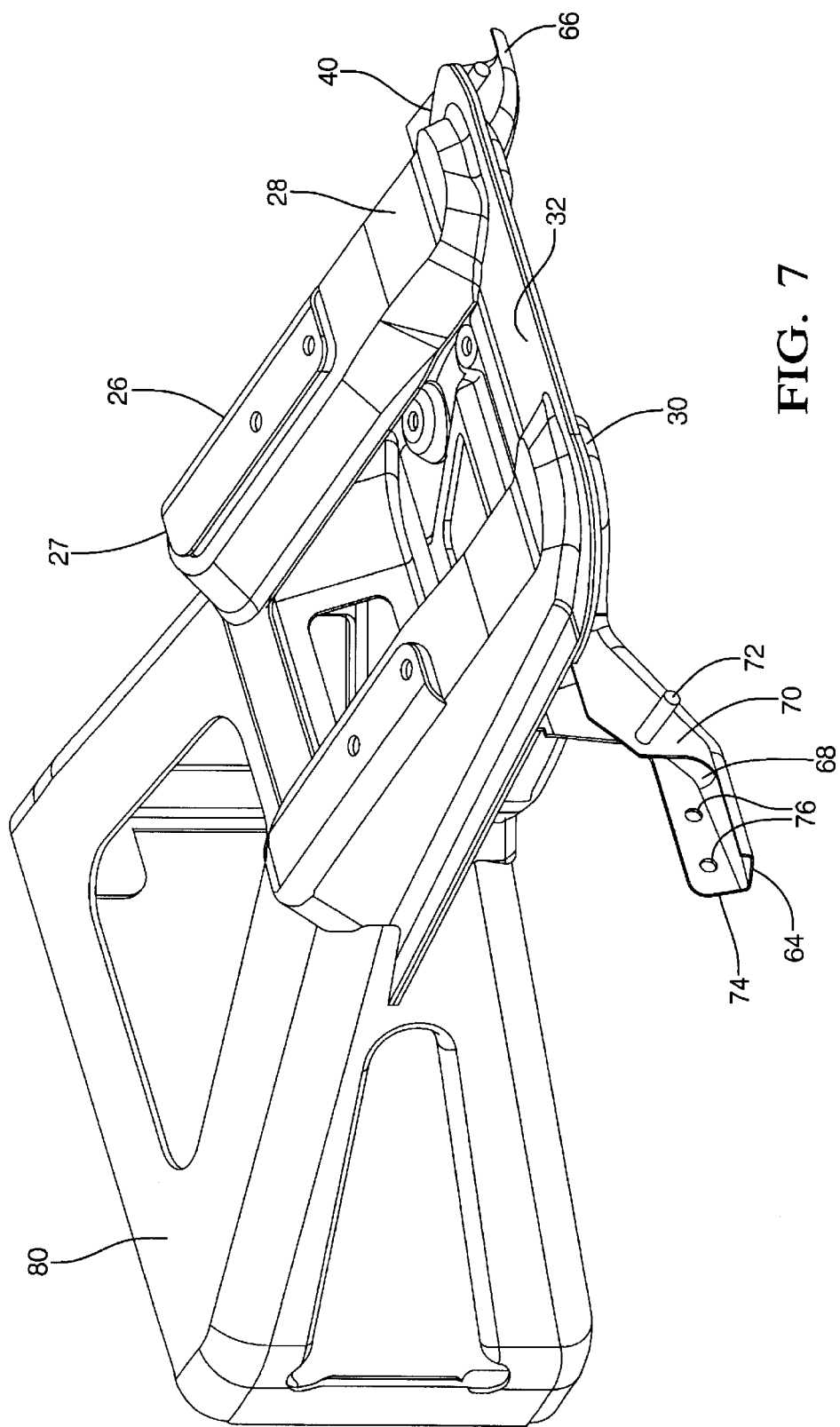
FIG. 7 is a perspective view of a steering column bracket.
Figure 8:
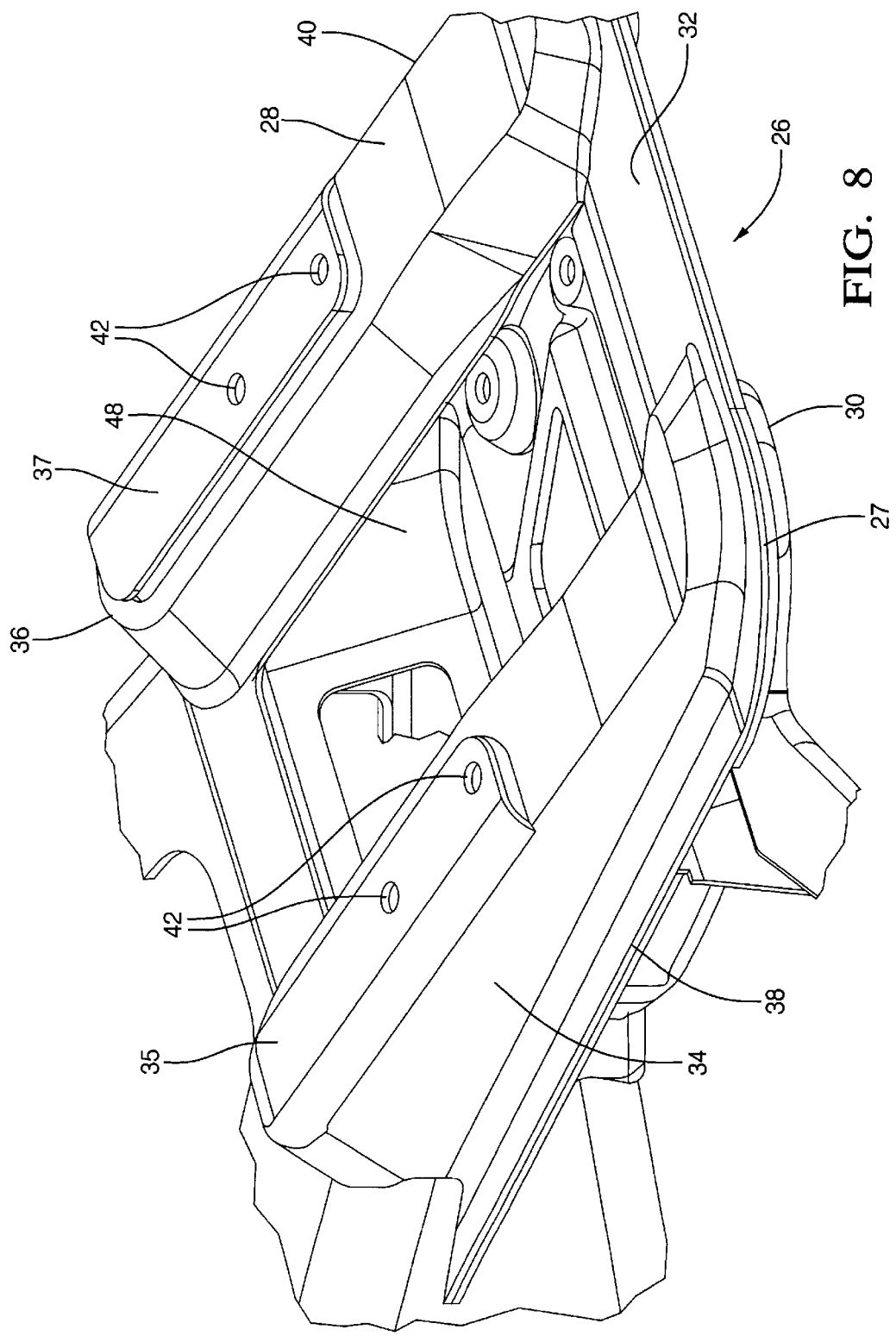
FIG. 8 is an enlarged perspective view of a portion of the steering column bracket of FIG. 7.

With special reference to FIGS. 7 and 10, second surface 30 of bracket portion 27 also includes a first mounting arm 64 and an opposing second mounting arm 66.

First mounting arm 64 is integrally formed with second surface 30, proximate to side edge 38. Second mounting arm 66 is integrally formed with second surface 30 proximate to side edge 40.

First and second mounting arms 64 and 66 are identically designed with the same components and dimensions, differing only in that they mirror one another. Thus, the constituents of first and second mounting arms 64 and 66 will be discussed simultaneously with the understanding that they are mirrored formations of one another.

Mounting arms 64 and 66 include a base flange 68. Flange 68 extends downward and away from respective side edges 38 and 40.

A pin flange 70 rises vertically from base flange 68 such that the pin flange is located proximate to structural air duct assembly 12 when the integrated steering column structural system 10 is fully assembled as shown in FIG. 1. Pin flange 70 includes a pin 72, disposed so that the pin extends away from base member 68.

Mounting arms 64 and 66 also include a bolt flange 74 formed on base flange 68. Bolt flange 74 is located opposite pin flange 70 such that bolt flange 74 rises vertically from base flange 68. Thus, bolt flange 74 faces pin flange 70. Bolt flange 74 includes holes 76 for receiving fastening members.

Mounting arms 64 and 66 facilitate mounting of steering column bracket 26 within integrated steering column structural system 10 according to the present invention. For example, mounting arms 64 and 66 allow attachment of steering column bracket 26 with structural air duct assembly 12 for supporting integrated steering column structural system 10 within vehicle 5.

Referring still to FIGS. 1–11, steering column bracket 26 further includes a steering column bracket extension 80 disposed adjacent to bracket portion 27. In one embodiment, bracket extension 80 is constructed of steel. Bracket extension 80 is fixably attached to bracket portion 27, for example, by welding.

Steering column extension bracket 80 has a first side 82 and a second side 84. First side 82 is proximate to engine wall 11 and is attachable thereto as discussed further herein. Second side 84 is located opposite first side 82 such that second side 84 is adjacent and mounted to the steering column bracket 26.

As mentioned above, steering bracket extension 80 is composed of steel. Extension 80 is welded at second side 84 to steering column bracket 26, which is also preferably composed of steel.

Steering column bracket extension 80 further includes sidewalls 86 and 88. In one embodiment, side walls 86 and 88 are triangular in shape, with apertures 90 and 92, respectively, formed therein. Apertures 90 and 92 attain a reduction in mass of the steering column bracket extension 80 while preserving the structural integrity thereof.

Side walls 86 and 88 are narrower in profile at second end 84 than at the first end 82 for load distribution purposes.

Side walls 86 and 88 further include a plurality of peg flanges 94 integrally formed at first end 82. In one embodiment, peg flanges 94 include a first peg flange formed on side wall 86 and a second peg flange formed on side wall 88.

First and second peg flanges 94 are integral elements that extend perpendicularly from side walls 86 and 88 toward a center axis A—A of steering column bracket 26.

Peg flanges 94 include pegs 96 disposed thereon, extending perpendicularly from the peg flanges 94 toward engine wall 11. Pegs 96 are received by engine wall 11 and retained thereby, thus facilitating mounting of integrated steering column structural system 10 with engine wall 11 within vehicle 5.

Steering column extension bracket 80 further includes a top wall 98 perpendicularly mounted to and adjoining side walls 86 and 88. In one embodiment, top wall 98 is trapezoidal in shape, having an aperture 100 formed centrally therein. Aperture 100 reduces mass of extension bracket 80 and yet preserves structural integrity.

Top wall 98 is of less width at second end 84 than at first end 82. At second end 84, top wall 98 is mounted to bracket portion 27.

Referring specifically to FIG. 5, steering column bracket extension 80 is mounted at first end 82 to engine wall 11. Pegs 96 are received within openings or the like formed in engine wall 11. Pegs are mounted to engine wall 11, for example, by welding. In another embodiment, pegs 96 are fastened to engine wall 1 by threading pegs 96 and mating the pegs with threaded fasteners within engine wall 11. In still another embodiment, first end 82 of extension 80 may be welded to the engine wall 11.

Integrated steering column structural system 10 supports the weight of steering column 7 within vehicle 5 and distributes the weight through a plurality of load paths to vehicle structural frame 4.

Figure 12:
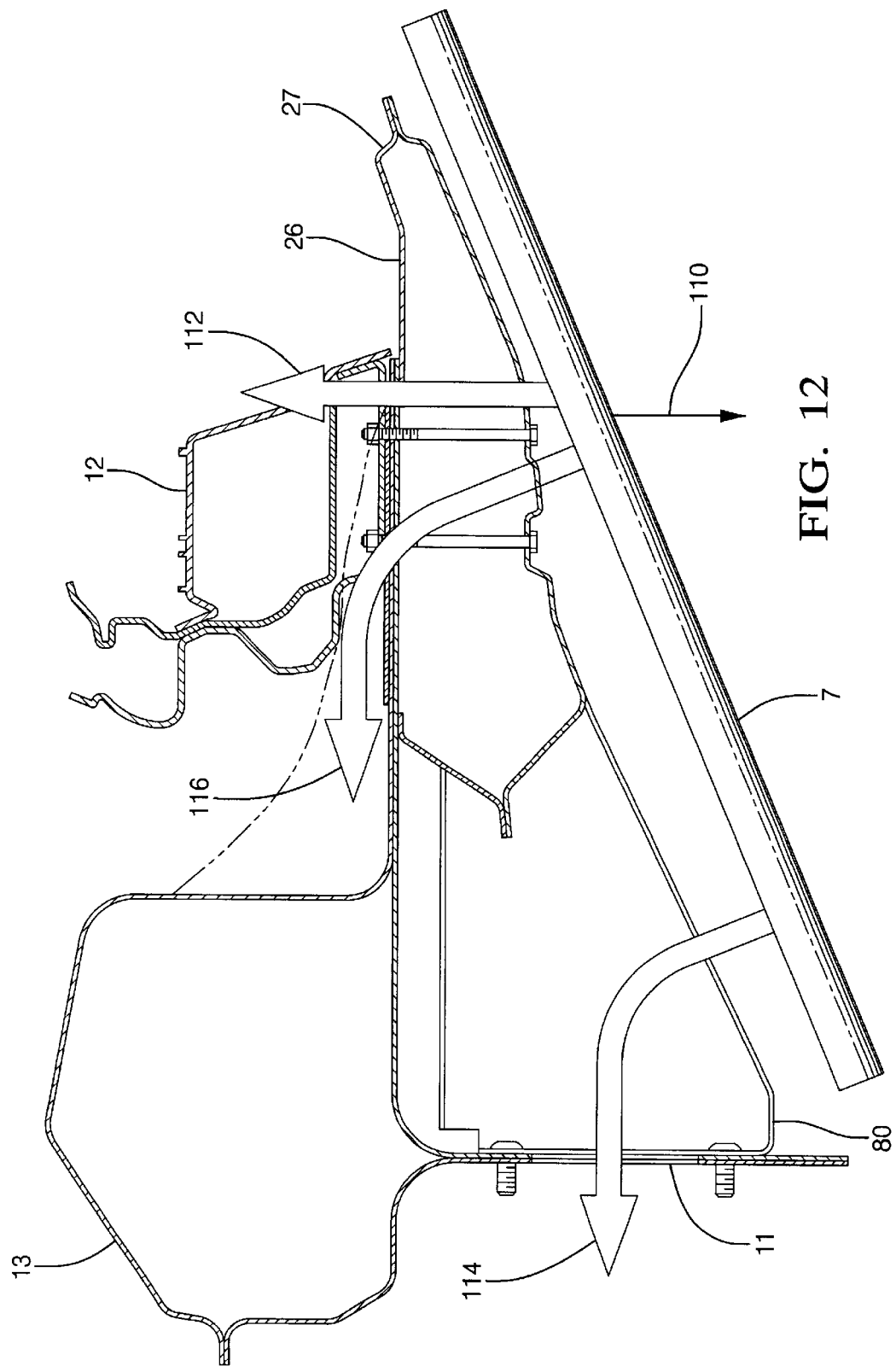
FIG. 12 is a cross-sectional view of the integrated steering column structural system having load paths illustrated thereon.

Referring now to FIGS. 1–12, a load 110 acts upon steering column 7 in a downward direction relative to integral steering column structural system 10. Load 110 results from the weight of steering column 7. Load 110, as depicted in FIG. 12, is shown in a condition where vehicle 5 is undergoing zero acceleration. It will be understood that negative or positive acceleration of vehicle 5 will change the direction of load 10, angling the load toward first or second ends 8 and 9. Such acceleration will also affect the magnitude of load 110 to the extent of the magnitude and direction of the acceleration. Load 110 depicts zero acceleration of vehicle 5 for exemplary purposes only and in no way limits the scope of the present invention.

A first load path 112 exists between steering column 7 and structural air duct assembly 12. Load path 112 represents the transference of load 110 from steering column 7 into steering column bracket 26, then through air duct structural assembly 12 and ultimately into the side walls of vehicle 5 where load 110 is transferred to and absorbed by the structural frame of the vehicle.

A second load path 114 exists between steering column bracket 26 and engine wall 11. Load 110 is distributed by load path 114 into bracket portion 27, through steering column bracket extension 80, and ultimately, into engine wall 11. Through engine wall 11, second load path 114 allows load 110 to be distributed to structural frame 4 of the vehicle.

Integrated steering column structural system 10 provides a third load path 116. Load path 116 distributes load 110 through plenum 13 to structural frame 4 of vehicle 5. Third load path 116 allows for the transfer of load 110 from its downward direction at steering column 7 to steering column bracket 26. Then load path 116 distributes load 110 through plenum mounting flanges 35 and 37 to mounting member 15 of plenum 13 through which load 110 is transferred to the structural frame of the vehicle through engine wall 11 and via direct connection thereto.

First, second, and third load paths 112, 114, and 116 allow integrated steering column structural system 10 to distribute load 110 through at least three distinct pathways to structural frame 4 of vehicle 5. This reduces the magnitude of the portion of load 110 carried by individual components within vehicle 5, thus reducing strain and wear on these components.

Less mass is required of the individual components of system 10 to bear the reduced magnitude of distributed steering column load 110. Accordingly, integrated steering column structural system 10 requires less material, thus reducing costs and labor.

Composites and plastics may be used in the construction of system 10 instead of more costly and less workable metals while still maintaining structural integrity and effective distribution of steering column load 110 within vehicle 5.

Specifically, structural air duct assembly 12 may be constructed, for example, entirely of plastics, reducing the weight and simplifying the manufacture thereof. The present invention does not require structural air duct assembly 12 to include steel ribbing or other reinforced structural support which would otherwise increase the mass of the assembly and complicate manufacturing processes. Of course, assembly 12 may be constructed of a plastic/metal composition.

Similarly, heavy load-bearing materials are not necessitated in the construction of the engine wall 11, plenum 13, and steering column bracket 26. Instead, these components may be constructed of plastics or metal/plastic composites because the individual load amounts carried by each component are reduced due to the load distribution effect of the present invention.

First, second, and third load paths 112, 114, and 116 also allow for the design of an increased first natural frequency of steering column 7 without requiring substantial increase in mass of individual components of structural system 10. Accordingly, the occurrence of the first natural frequency may be prevented while mass of vehicle 5 is kept at a minimum.

Reduced mass of the integrated steering column structural system and associated components results in the utilization of less materials during manufacturing of the vehicle. This reduces overall manufacturing costs and achieves a lighter weight, and a more efficient vehicle.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A structural system for use within a vehicle, comprising:
   a) a steering column support for supporting a steering column and distributing a steering column load, said steering column support comprising a bracket portion and an extension portion; and
   b) a plurality of load distribution components for receiving said steering column load and distributing said steering column load to a vehicle structural frame, said bracket portion having a first surface and a second surface, said extension portion being mounted at a first end to said bracket portion and having a second end for mounting to at least one of said plurality of load distribution components, wherein the second surface includes a first protuberance integrally formed proximate to a first side edge, a second protuberance integrally formed proximate to a second side edge, and a third protuberance integrally formed therebetween and extending across said second surface from said first protuberance to said second protuberance, wherein the first, second, and third protuberances protrude from said second surface, and the first and second protuberances include mounting holes for mounting the steering column support within the vehicle, the second surface further including mountings formed thereon for fastening the steering column to the steering column support.

2. The structural system as in claim 1, wherein the second surface further includes mass reducing apertures for reducing the overall mass of the steering column support.

3. The structural system as in claim 2, wherein the second surface includes at least one mounting arm extending from the steering column support for mounting the steering column support within the vehicle.

4. The structural system as in claim 1, wherein said steering column support comprises a bracket portion and an extension portion mounted thereto, where said bracket portion includes at least one mounting flange for attaching said steering column support to at least one of said plurality of load distribution components, and where said extension portion includes at least one mounting flange for attaching said steering column support to at least one of said plurality of load distribution components.

5. The structural system as in claim 1, wherein said steering column support includes apertures for reducing the overall mass of said steering column support.

6. The structural system as in claim 1, wherein said steering column support comprises a bracket portion and an extension portion, the bracket portion having a first surface and a second surface, the extension portion being mounted at a first end to the bracket portion and having a second end for mounting to at least one of said plurality of load distribution components.

7. The structural system as in claim 6, wherein the first surface includes a first protuberance integrally formed proximate to a first side edge, and a second protuberance integrally formed proximate to a second side edge wherein an aperture is formed therebetween, the first and second protuberances having mounting flanges formed thereon for receiving and retaining at least one of said plurality of load distribution components.

8. The structural system as in claim 1, wherein said steering column support includes a first side and a second side, the first side and second side having mounting holes formed therein for receiving bolts for mounting said steering column support to at least one of said plurality of load distribution components.

9. The structural system as in claim 1, wherein the steering column support further includes an extension portion having a first end for attaching to at least of said plurality of load distribution components and a second end for attaching to the steering column support, wherein the first end is larger than the second end.

10. A structural system for increasing a first natural frequency of a steering column in a vehicle, comprising a first load path distributing a first portion of a load of said steering column, said first load path being defined by a steering column bracket and a structural air duct assembly, said steering column bracket securing said steering column to said structural air duct assembly, said structural air duct assembly extending in a direction perpendicular to said steering column;

a second load path distributing a second portion of said load, said second load path being defined by a plenum and said steering column bracket, said steering column bracket securing said steering column to said plenum, said plenum extending in a direction perpendicular to said steering column; and a third load path distributing a third portion of said load, said third load path being defined by a mounting surface of said steering column bracket and an engine wall of said vehicle, said mounting surface being configured to secure said steering column bracket to said engine wall, said first load path being proximate a first end of said steering column, said third load path being proximate a second end of said steering column, and said second load path being between said first load path and said third load path, said first, second, and third load paths being positioned and configured to increase said first natural frequency such that vibration of said steering column is reduced during use of said vehicle.

11. The structural system as in claim 10, wherein said first, second, and third load paths are all in a direction above said steering column.

12. The structural system as in claim 10, wherein said first, second, and third load paths are configured to suspend said steering column from said steering column bracket.

13. The structural system as in claim 10, wherein said steering column bracket comprises:

a bracket portion defining said first and second load paths; and an extension portion defining said third load path.

14. The structural system as in claim 13, wherein said bracket portion comprises:

a first surface being configured to secure said steering column to both said structural air duct assembly and said plenum; and a second surface including a first protuberance formed proximate to a first side edge, a second protuberance formed proximate to a second side edge, and a third protuberance extending across said second surface from said first protuberance to said second protuberance, wherein the first, second, and third protuberances protrude from said second surface.

* * * * *